United States Patent
Yoon (10) Patent No.: US 8,832,843 B2
(45) Date of Patent: Sep. 9, 2014

(54) STORAGE DEVICES WITH SECURE DEBUGGING CAPABILITY AND METHODS OF OPERATING THE SAME

(75) Inventor: Chanho Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 614 days.

(21) Appl. No.: 12/783,953

(22) Filed: May 20, 2010

(65) Prior Publication Data

US 2010/0299467 A1    Nov. 25, 2010

(30) Foreign Application Priority Data

May 21, 2009   (KR) ........................ 10-2009-0044590

(51) Int. Cl.
| | |
|---|---|
| *G06F 7/04* | (2006.01) |
| *G06F 17/30* | (2006.01) |
| *H04N 7/16* | (2011.01) |
| *G06F 11/30* | (2006.01) |
| *G06F 11/36* | (2006.01) |
| *G06F 21/78* | (2013.01) |
| *H04L 9/32* | (2006.01) |
| *G06F 11/00* | (2006.01) |
| *G06F 21/00* | (2013.01) |
| *G06F 13/36* | (2006.01) |
| *G06F 9/00* | (2006.01) |
| *H04L 29/06* | (2006.01) |

(52) U.S. Cl.
CPC ................. *G06F 11/362* (2013.01); *H04L 9/32* (2013.01); *G06F 11/3089* (2013.01); *G06F 11/30* (2013.01); *G06F 11/00* (2013.01); *G06F 21/00* (2013.01); *G06F 13/36* (2013.01); *G06F 21/78* (2013.01); *G06F 11/3648* (2013.01); *G06F 9/00* (2013.01); *H04L 63/00* (2013.01)

USPC ................... 726/26; 726/27; 726/28; 726/29; 726/30; 710/105; 710/108

(58) Field of Classification Search
CPC .......... G06F 9/00; G06F 11/00; G06F 11/30; G06F 11/3089; G06F 13/36; G06F 13/42; G06F 21/00; H04L 9/32; H04L 63/00
USPC ................................ 726/26–30; 710/105, 108
See application file for complete search history.

(56) References Cited

U.S. PATENT DOCUMENTS

| 6,769,622 B1 * | 8/2004 | Tournemille et al. ......... 235/492 |
| 7,080,258 B2 * | 7/2006 | Kawasaki et al. ............. 713/189 |

(Continued)

FOREIGN PATENT DOCUMENTS

| KR | 10-2007-0036159 | 4/2007 |
| KR | 10-2007-70036159 | 4/2007 |

*Primary Examiner* — Jeffrey Pwu
*Assistant Examiner* — Jayesh Jhaveri
(74) *Attorney, Agent, or Firm* — Myers Bigel Sibley & Sajovec, P.A.

(57) ABSTRACT

A device includes a first bus, a second bus, a processor configured to communicate with a storage circuit through the first bus and to communicate with a debug host through the second bus and a control circuit configured to inhibit transfer of data from the second bus to the debug host while receiving authentication information from the debug host and to enable transfer of data from the second bus to the debug host responsive to authentication of the received authentication information. The control circuit may be configured to inhibit data transfer from the second bus to the debug host by causing dummy data to be transmitted to the debug host over a transmit channel between the device and the debug host.

18 Claims, 9 Drawing Sheets

(56) References Cited

U.S. PATENT DOCUMENTS

| | | |
|---|---|---|
| 7,248,069 B2 | 7/2007 | Moyer et al. |
| 7,266,848 B2 | 9/2007 | Moyer et al. |
| 2003/0110430 A1* | 6/2003 | Bailis et al. .................. 714/725 |
| 2006/0225043 A1* | 10/2006 | Oda et al. ..................... 717/124 |
| 2007/0168729 A1* | 7/2007 | Chan ............................... 714/30 |
| 2007/0220337 A1* | 9/2007 | Itoh et al. ........................ 714/30 |
| 2008/0082828 A1 | 4/2008 | Jennings et al. |
| 2009/0288160 A1* | 11/2009 | Esliger et al. ................... 726/17 |
| 2010/0169523 A1* | 7/2010 | Dunstan et al. ............... 710/104 |
| 2010/0199077 A1* | 8/2010 | Case et al. ....................... 713/1 |
| 2010/0263043 A1* | 10/2010 | Xu .................................. 726/17 |

* cited by examiner

STORAGE DEVICES WITH SECURE DEBUGGING CAPABILITY AND METHODS OF OPERATING THE SAME

CROSS-REFERENCE TO RELATED APPLICATIONS

This U.S. non-provisional patent application claims the priority under 35 U.S.C. §119 of Korean Patent Application No. 10-2009-0044590, filed on May 21, 2009, the entire contents of which are hereby incorporated by reference.

BACKGROUND

The present disclosure herein relates to storage devices and methods of operating the same and, more particularly, to storage devices with debugging capabilities and methods of operating the same.

A storage device is a memory device that can store data and read the stored data if necessary. A storage device may include a hard disk drive (HDD), an optical disk drive (ODD), a magnetic tape, a semiconductor storage circuit and the like.

Semiconductor memory devices are typically classified into volatile memory devices and nonvolatile memory devices. A volatile memory device is a memory device which loses data stored therein when power supply is inhibited. Volatile memory devices may include SRAM, DRAM and SDRAM devices. A nonvolatile memory device is a memory device which does not lose data stored therein even when power supply is inhibited. Nonvolatile memory devices may include ROM, PROM, EPROM, EEPROM, flash, RAM, MRAM, RRAM and FRAM devices. Flash memory devices are commonly classified as NOR type or NAND type.

SUMMARY

Some embodiments of the inventive subject matter provide a device including a first bus, a second bus, a processor configured to communicate with a storage circuit through the first bus and to communicate with a debug host through the second bus and a control circuit configured to inhibit transfer of data from the second bus to the debug host while receiving authentication information from the debug host and to enable transfer of data from the second bus to the debug host responsive to authentication of the received authentication information. The control circuit may be configured to inhibit data transfer from the second bus to the debug host by causing dummy data to be transmitted to the debug host over a transmit channel between the device and the debug host.

In further embodiments, the device further includes an authentication circuit coupled to the first bus and configured to internally generate authentication information and to compare the internally generated authentication information with the received authentication information from the debug host.

In some embodiments, the control circuit comprises a debug control circuit attached to the second bus and configured to be coupled to the debug host by a transmit channel and a receive channel, the debug control circuit configured to selectively transfer data between the second bus and each of the transmit channel and the receive channel. The debug control circuit may include an attachment detection circuit configured to detect attachment of the debug host and to responsively generate a detection signal and a protocol conversion circuit configured to perform a protocol conversion between the debug host and the processor and to inhibit transfer of data from the second bus to the transmit channel in response to the detection signal. The protocol conversion circuit may include a mask circuit configured to output dummy data when a control signal is in an inactive state and to enable transfer between the second bus and the transmit channel when the control signal is in an active state.

In further embodiments, the device may include an authentication circuit configured to communicate with the processor through the first bus and to receive authentication information from the debug control circuit via the second bus, the processor and the first bus. The authentication circuit may be configured to generate internal authentication information, to compare the received authentication information with the internal authentication information and to activate the control signal according to a comparison result. The authentication circuit may include a seed generation circuit configured to generate a seed, an internal authentication information generation circuit configured to generate internal authentication information based on the seed, an authentication information check circuit configured to compare the received authentication information with the internal authentication information and an authentication control circuit configured to activate the control signal according to the comparison result.

The authentication circuit may be configured to activate the control signal when the received authentication information is identical to the internal authentication information. The authentication circuit may be configured to activate the control signal when correlation degree between the received authentication information and the internal authentication information meets a predetermined criterion. The control signal may be directly provided from the authentication circuit to the debug control circuit or the control signal may be transferred to the debug control circuit through the first bus, the processor and the second bus.

The processor may be configured to communicate with the storage circuit while the debug host is authenticated. The first bus, the second bus, the processor and the control circuit may be included in a solid state drive (SSD). The first bus, the second bus, the storage circuit, the processor and the control circuit may be included in a memory card.

Further embodiments of the inventive subject matter may provide a device including a storage circuit, a debug control circuit, a first bus, a second bus, and a control circuit. The debug control circuit is configured to exchange data with exterior. The second bus is isolated from the first bus. The control circuit is configured to control the storage circuit through the first bus and control the debug control circuit through the second bus. The control circuit is further configured to inhibit transfer of data of the debug host while enabling reception of data of the debug control circuit until authentication data is received through the debug control circuit. and a control circuit configured to control the storage circuit. The control circuit may include a first bus, a second bus and a processor configured to communicate with the storage circuit through the first bus and to communicate with a debug host through the second bus. The control circuit may be configured to inhibit transfer of data from the second bus to the debug host while authentication information is received from the debug host and to enable transfer of data from the second bus to the debut host responsive to authentication of the debug host.

Still further embodiments provide methods of operating a device comprising a processor and a storage circuit coupled by a system bus. The methods include detecting coupling of a debug host to a debug bus coupled to the processor, authenticating the debug host responsive to detection of the debug host while inhibiting transfer of data from the debug bus to the debug host and enabling transfer of data from the debug bus to the debug host responsive to authentication of the debug host.

While the debug host is authenticated, the processor is enabled to perform read and/or write operations over the system bus. Authenticating of the debug host may include receiving authentication information from the debug host and comparing the received authentication information with internally generated authentication information.

BRIEF DESCRIPTION OF THE DRAWINGS

The accompanying drawings are included to provide a further understanding of the inventive subject matter, and are incorporated in and constitute a part of this specification. The drawings illustrate exemplary embodiments of the inventive subject matters and, together with the description, serve to explain principles of the inventive subject matter. In the drawings.

DETAILED DESCRIPTION OF EMBODIMENTS

Embodiments of the inventive subject matter provide storage devices, including: first and second buses; and a processor configured to communicate with a storage circuit through the first bus and communicate with an external debug host through the second bus, wherein when the storage device is attached to the debug host, a transmit channel toward the debug host is inhibited and authentication information is received through a receiving channel from the debug host, and wherein the transmit channel toward the debug host is allowed according to an authentication result of the debug host.

In yet further embodiments of the inventive subject matter, storage devices include: a storage circuit; and a controller configured to control the storage circuit, wherein the controller may include: first and second buses; and a processor configured to communicate with a storage circuit through the first bus and communicate with an external debug host through the second bus, wherein when the storage device is attached to the debug host, a transmit channel toward the debug host is inhibited and authentication information is received through a receiving channel from the debug host, and wherein the transmit channel toward the debug host is allowed according to an authentication result of the debug host.

In other embodiments of the inventive subject matter, methods of operating a storage device, include: detecting whether a debug host is attached to a debug bus; authenticating the debug host according to the detection result while inhibiting a transmit channel toward the debug host; and allowing the transmit channel according to the authentication result, wherein while the debug host is authenticated, a read or write operation is performed through a system bus.

Exemplary embodiments of the inventive subject matter will be described below in more detail with reference to the accompanying drawings. The inventive subject matter may, however, be embodied in different forms and should not be construed as limited to the embodiments set forth herein. Rather, these embodiments are provided so that this disclosure will be thorough and complete, and will fully convey the scope of the inventive subject matter to those skilled in the art.

Figure 1:
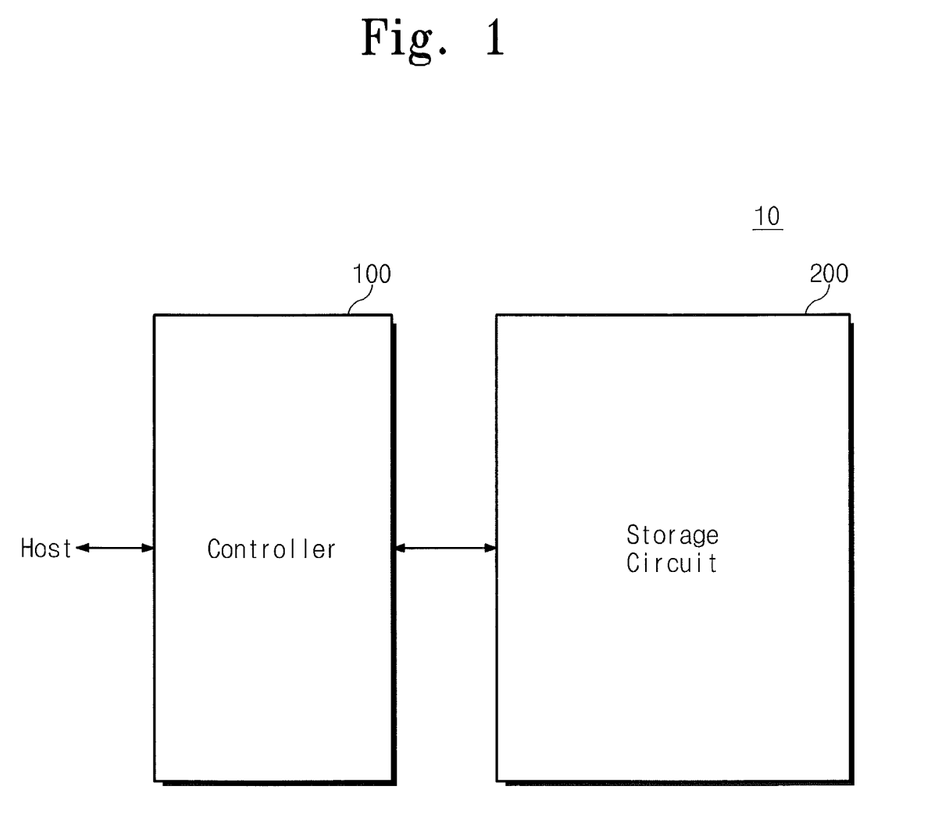
FIG. 1 is a block diagram of a storage device according to some embodiments of the inventive subject matter.

FIG. 1 is a block diagram of a storage device 10 according to some embodiments of the inventive subject matter. The storage device 10 includes a controller 100 and a storage circuit 200.

The controller 100 is attached to a host and the storage circuit 200. The controller 100 is configured to transfer data read out of the storage circuit 200 to the host and store data transferred from the host in the storage circuit 200. The controller 100 is configured to communicate with a debug host. The debug host may debug an operation of the controller 100. Constitution and operation of the controller 100 will be described in more detail with reference to FIGS. 2 through 7.

The storage circuit 200 is configured to operate in response to the controller 100. For example, the storage circuit 200 may be configured to receive data from the controller 100 and store the received data. The storage circuit 200 may be configured to read data stored therein in response to the controller 100.

In some embodiments, the storage circuit 200 may include a plurality of disks. The storage circuit 200 may be configured, for example, to magnetically store data in the plurality of disks. For example, the controller 100 and the storage circuit 200 may constitute a hard disk drive (HDD). In some embodiments, the storage circuit 200 may be configured to optically store data in a disk. For example, the controller 100 and the storage circuit 200 may constitute an optical disk drive (ODD).

In further embodiments, the storage circuit 200 may be configured to store data in semiconductor memory. For example, the storage circuit 200 may include a memory cell array for storing data, a read/write circuit for writing/reading data in/from the memory cell array, an address decoder for decoding an address received from an external device and transferring the decoded address to the read/write circuit, and a control logic for controlling the storage circuit 200.

In some embodiments, the storage circuit 200 may include a volatile memory, such as DRAM, SRAM and SDRAM. In further embodiments, the storage circuit 200 may include a nonvolatile memory, such as ROM, PROM, EPROM, EEPROM, a flash memory, PRAM, MRAM, RRAM, and FRAM.

The controller 100 and the storage circuit 200 may be integrated into one semiconductor device. In some embodiments, the controller 100 and the storage circuit 200 may be integrated into one memory card, such as a PC card (e.g., PCMCIA (Personal Computer Memory Card International Association)), a compact flash card (CF), a smart media card (SM/SMC), a memory stick, a multimedia card (e.g., MMC, RS-MMC and MMCmicro), an SD card (e.g., SD, miniSD, microSD and SDHC), or a universal flash storage (UFS).

In further embodiments, the controller 100 and the storage circuit 200 may be integrated into a solid state drive (SSD). The SSD may include, for example, a storage device that is configured to store data in semiconductor memory. In embodiments in which the storage device 10 is used as an SSD, the operation speed of the host connected to the storage device 10 may be increased.

In some embodiments, the storage device 10 may be implemented in computers, portable computers, UMPCs (Ultra Mobile PCs), workstations, net-books, PDAs, web tablets, wireless phones, mobile phones, smart phones, digital cameras, digital audio recorders, digital audio players, digital picture recorders, digital picture players, digital video recorders, digital video players, devices capable of transmitting/receiving information in wireless environments, one of various component electronic devices of a home network, one of various component electronic devices of a computer network, one of various component electronic devices of a telematics network, or one of various components devices of a computing system (e.g., an SSD and a memory card).

In some embodiments, the storage circuit 200 or the storage device 10 may be mounted in various types of packages. Examples of the packages that may be used for the storage circuit 200 or the storage device 10 include Package on Package (PoP), Ball Grid Arrays (BGA), Chip Scale Packages (CSP), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi Chip Package (MCP), Wafer-level Fabricated Package (WFP), and Wafer-level Processed Stack Package (WSP).

Figure 2:
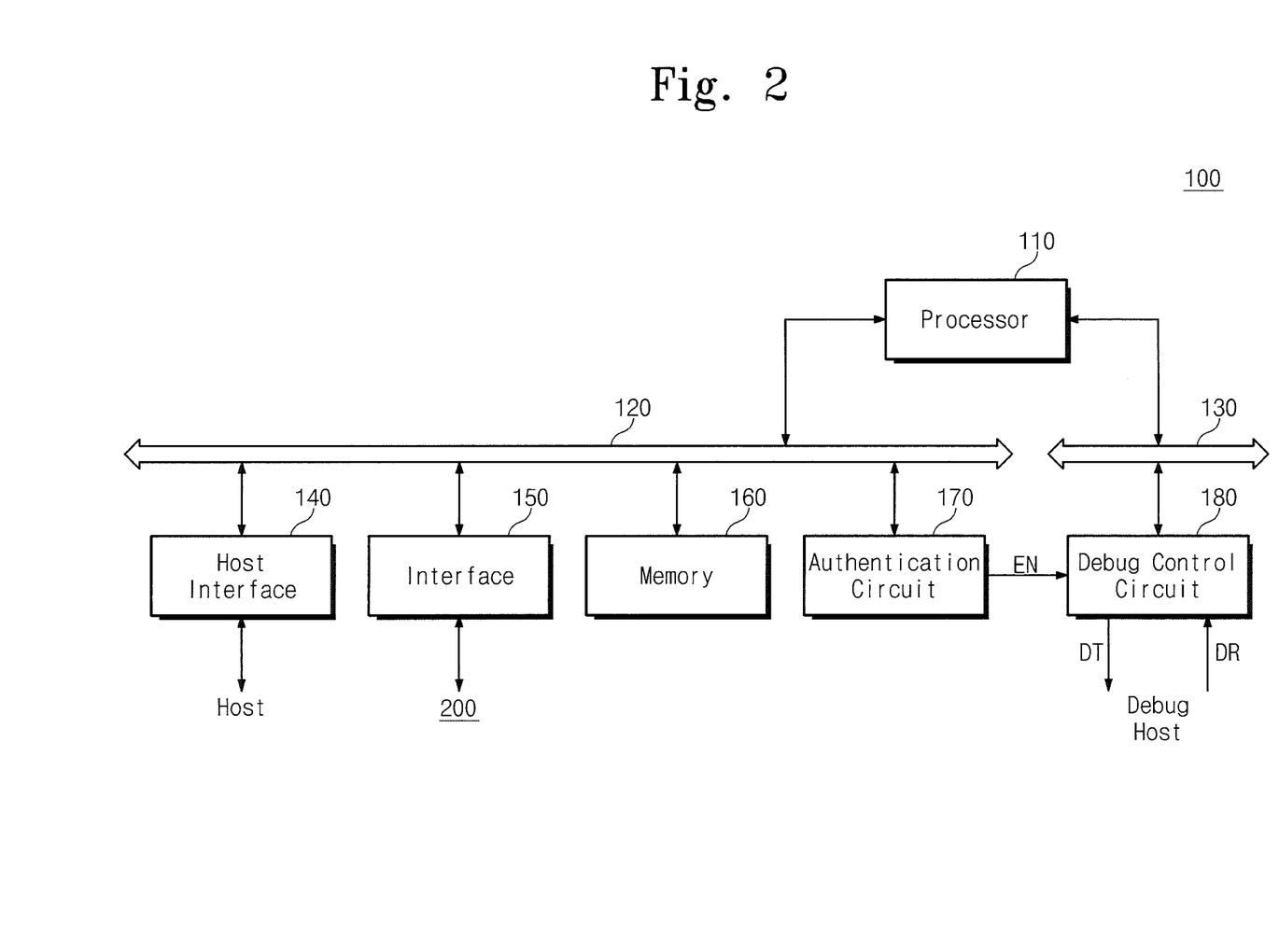
FIG. 2 is a block diagram of the controller of FIG. 1.

FIG. 2 is a block diagram of the controller 100 of FIG. 1. The controller 100 includes a processor 110, a first bus 120, a second bus 130, a host interface 140, an interface 150, a memory 160, an authentication circuit 170, and a debug control circuit 180.

The processor 110 is configured to control operations of the controller 100. The processor 110 is configured to communicate with the storage device 200 and the host interface 140, the interface 150, the memory 160 and the authentication circuit 170 through the first bus 120. The processor 110 may be configured to control a read or write operation with respect to the storage device 200. The processor 110 may be configured, for example, to execute a driver for driving the storage device 200. For example, the processor 110 may be configured to execute a host driver. The processor 110 may be configured to execute various software programs or modules.

The host interface 140 is attached to the first bus 120. The host interface 140 may support a protocol for data exchange between the host and the controller 100. For example, the host interface 140 may support one of various interface protocols, such as USB (Universal Serial Bus), MMC (Multimedia Card), PCI-E (PCI-Express), ATA (Advanced Technology Attachment), Serial-ATA, Parallel-ATA, SCSI (Small Computer Small Interface), ESDI (Enhanced Small Disk Interface), and IDE (Integrated Drive Electronics).

The interface 150 is attached to the first bus 120. The interface 150 may support a protocol for communication between the controller 100 and the storage device 200.

The memory 160 is attached to the first bus 120. The memory 160 may function as an operational memory of the controller 100. For example, the processor 110 may execute the host driver by using the memory 160. The processor 110 may execute firmware and/or firmware stored by the memory 160.

The authentication circuit 170 is attached to the first bus 120. The authentication circuit 170 is configured to authenticate the debug host connected to the controller 100. When the debug host is authenticated, the authentication circuit 170 is configured to activate a control signal EN. For example, the authentication circuit 170 may receive authentication information from the debug host through the second bus 130, the processor 110, and the first bus 120. The authentication circuit 170 may generate internal authentication information. The authentication circuit 170 may compare the received authentication information with the internal authentication information. According to the comparison result, the authentication circuit 170 may activate the control signal EN.

The debug control circuit 180 is configured to communicate with the processor 110 through the second bus 130. The debug control circuit 180 is configured to detect an attachment of the debug host and control a communication channel to the debug host according to the detection and authentication result. For example, when the debug host is attached, the debug control circuit 180 may allow a receiving channel DR from and inhibit a transmit channel DT toward the debug host. The debug control circuit 180 may also inhibit debugging by the debug host. The debug control circuit 180 may receive authentication information from the debug host through the receiving channel DR. The received authentication information may be transferred to the authentication circuit 170 through the second bus 130, the processor 110 and the first bus 120.

When the debug host is authenticated, the debug control circuit 180 may transmit the transmit channel DT toward the debug host. Then, the debug control circuit 180 may enable debugging by the debug host. For example, the debug control circuit 180 may enable the transmit channel DT to the debug host in response to the control signal EN.

The debug control circuit 180 may support a protocol for communication with the debug host. For example, the debug control circuit 180 may be configured to communicate with the debug host by using a JTAG (Joint Test Action Group) protocol, a serial wire protocol or the like. In some embodiments, the debug control circuit 180 may be configured to communicate with the processor 110 by using a DAP (Direct Access Protocol) or the like.

The first bus 120 provides a communication channel between the processor 110, the host interface 140, the interface 150, the memory 160 and the authentication circuit 170. For example, the first bus 120 may provide a communication channel for operation of the controller 110. In some embodiments, the first bus 120 may be a system bus. For example, the processor 110 may transfer a read or write command to the storage circuit 200. The processor 110 may control the interface 150 such that write data is transferred to the storage circuit 200 through the first bus 120. The processor 110 may control the interface 150 such that read data is transferred from the storage circuit 200 through the first bus 120.

The second bus 130 provides a communication channel between the processor 110 and the debug control circuit 180. The second bus 130 may be a bus provided for debugging of the controller 110, for example, the second bus 130 may be a debug bus. The second bus 130 may be configured to provide a channel only between the processor 110 and the debug control circuit 180. For example, a debug command from the debug host may be transferred to the processor 110 through the second bus 130. A break or resume command from the debug host may be transferred to the processor 110 through the second bus 130. The processor 110 may be configured to transfer debug information to the debug host through the second bus 130 in response to a debug command from the debug host. For example, the processor 110 may be configured to transfer codes to the debug host through the second bus 130.

The first bus 120 and the second bus 130 may be separate from each other. The debug host may be configured to perform debugging of the controller 100 only through the second bus 130. For example, the processor 110 may be configured to assign a memory layout to the second bus 130 and not to assign the memory layout to the first bus 120. The memory layout shows how each element of the storage device 10 is used, for example, the memory layout may be a memory map. Accordingly, it may be prohibited to debug the storage device 10 through the first bus 120. It may be possible that the debug host connected to the second bus 130 debugs the storage device 10 by using the assigned memory layout. Thus, it may be possible to control debugging operation of the debug host by the debug control circuit provided in the second bus 130.

It will be understood that the authentication circuit 170 may be embodied by a digital circuit, an analog circuit, or a combination of a digital circuit and an analog circuit. It will be also understood that the authentication circuit 170 may be embodied by hardware or a combination of hardware and software.

It will be understood that the debug control circuit 180 may be embodied by a digital circuit, an analog circuit, or a combination of a digital circuit and an analog circuit. It will be also understood that the debug control circuit 180 may be embodied as hardware or a combination of hardware and software.

The controller 100 may further include an error correction block. The error correction block may be configured to detect and correct an error of data read from the storage circuit 200. For example, the controller 100 may be configured such that the error correction block is attached to the first bus 120.

Figure 3:
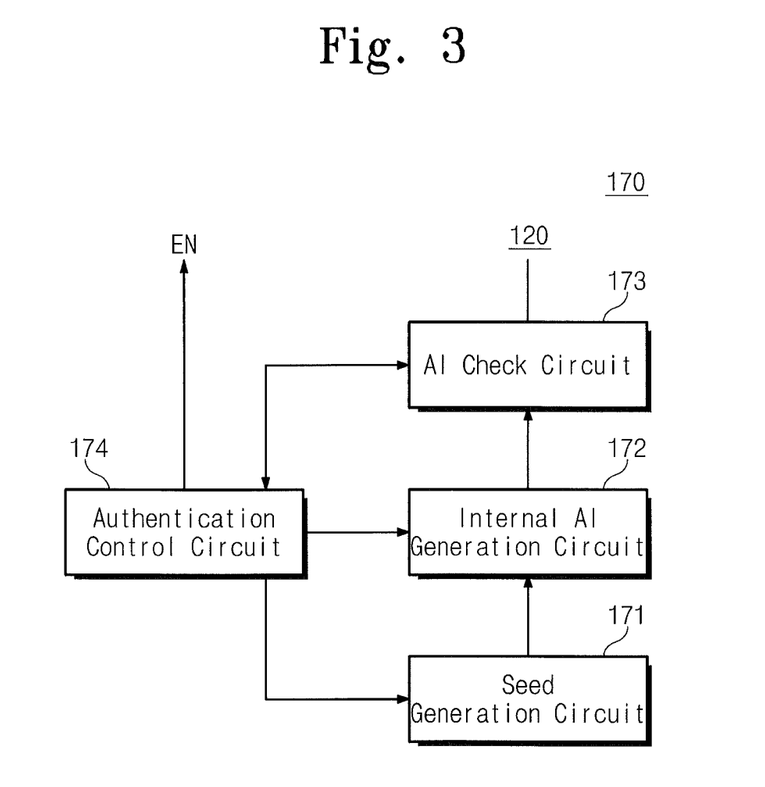
FIG. 3 is a block diagram of the authentication circuit of FIG. 2.

FIG. 3 is a block diagram of the authentication circuit 170 of FIG. 2. The authentication circuit 170 includes a seed generation circuit 171, an internal Authentication Information (AI) generation circuit 172, an AI check circuit 173, and an authentication control circuit 174.

The seed generation circuit 171 is configured to generate a seed for generating internal authentication information. For example, the seed generation circuit 171 may include a program circuit, such as an electric fuse, a program register and the like. Accordingly, by programming the seed generation circuit 171, it may be possible to provide various seeds. A seed generated in the seed generation circuit 171 may be provided in the internal AI generation circuit 172.

The internal AI generation circuit 172 is configured to generate internal AI by using the seed provided from the seed generation circuit 171. The internal AI generated in the internal AI generation circuit 172 may be used for authentication of the debug host. In some embodiments, the internal AI may be a password generated by using the seed provided from the seed generation circuit 171. For example, the seed generation circuit 171 may be configured to generate the internal AI by using an algorithm such as SHA-1, Pseudo Random Generation or the like. The internal AI generated in the internal AI generation circuit 172 is provided to the AI check circuit 173.

The AI check circuit 173 is configured to receive the external AI of the debug host through the first bus 120. The AI check circuit 173 receives the internal AI from the internal AI generation circuit 172. The AI check circuit 173 is configured to compare the external AI with the internal AI.

The authentication control circuit 174 is configured to control the seed generation circuit 171, the internal AI generation circuit 172, and the AI check circuit 173. The authentication control circuit 174 is configured to activate the control signal EN according to the comparison result between the AI and the internal AI.

For example, in some embodiments, when the AI is identical to the internal AI, the authentication control circuit 174 may activate the control signal EN. In some embodiments, when a correlation between the AI and the internal AI m meets a predetermined criterion, the authentication control circuit 174 may activate the control signal EN. When the control signal EN is activated, the debug host has been authenticated.

Figure 4:
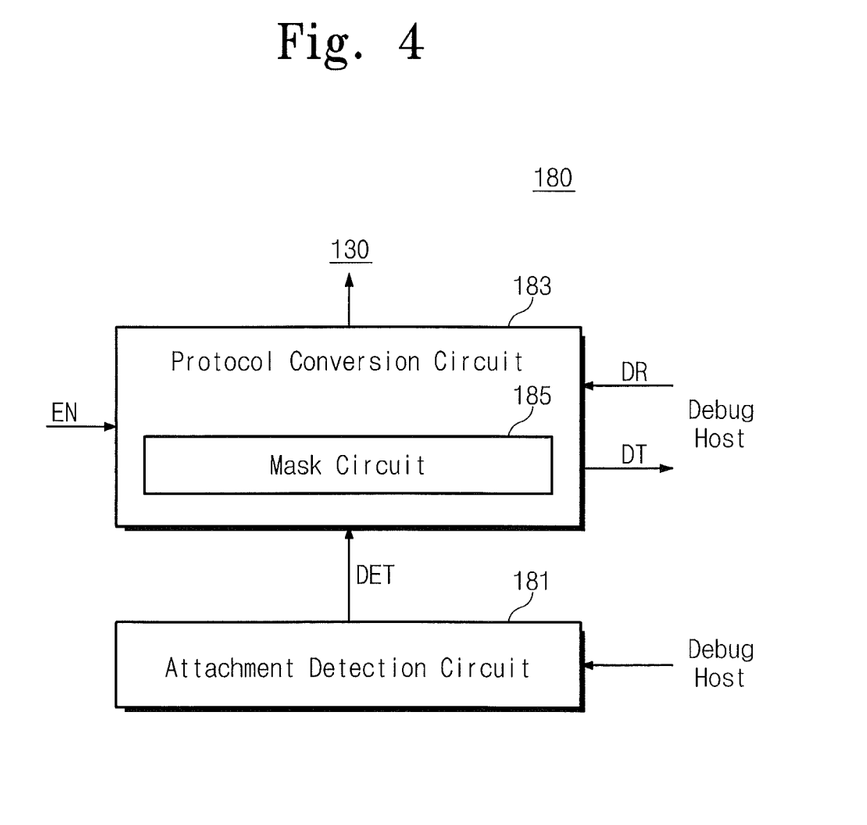
FIG. 4 is a block diagram of the debug control circuit of FIG. 2.

FIG. 4 is a block diagram of the debug control circuit 180. The debug control circuit 180 includes an attachment detect circuit 181 and a protocol conversion circuit 183. The attachment detection circuit 181 is configured to detect a connection of the debug host. For example, when the debug host is attached to the debug control circuit 180, the attachment detection circuit 181 generates a detection signal DET. The detection signal DET may be transferred to the protocol conversion circuit 183. For example, the attachment detection circuit 181 may be configured to detect attachment of the debug host through variation of capacitance, variation of voltage, variation of current, application of signal or the like.

The protocol conversion circuit 183 receives the detection signal DET from the attachment detection circuit 181. When the detection signal DET is activated, the protocol conversion circuit 183 inhibits the transmit channel DT toward the debug host and enables the receiving channel DR from the debug host. The protocol conversion circuit 183 receives the authentication information from the debug host through the receiving channel DR. The received authentication information is transferred to the authentication circuit 170 through the second bus 130, the processor 110 and the first bus 120. When the control signal EN is activated, the protocol conversion circuit 183 is configured to enable the transmit channel DT. Also, when the control signal EN is activated, the protocol conversion circuit 183 is configured to allow debugging by the debug host. That is, when the control signal EN is activated, the debug host may debug the storage device 10.

The protocol conversion circuit 183 interfaces between the debug host and the processor 110. The protocol conversion circuit 183 may include a mask circuit 185 for inhibiting or enabling the transmit channel DT in response to the control signal EN.

Figure 5:
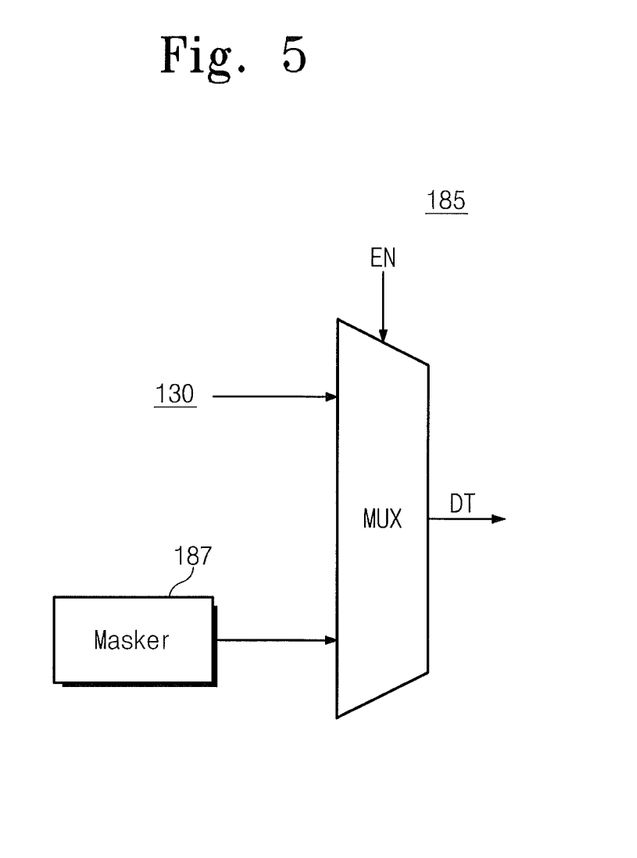
FIG. 5 is a block diagram of the mask circuit of FIG. 4.

FIG. 5 is a block diagram of the mask circuit 185 of FIG. 4. The mask circuit 185 includes a multiplexer (MUX) and a masker 187. The MUX is configured to selectively transmit data from the second bus 130 or an output of the masker 187 in response to the control signal EN.

The masker 187 may be configured to generate dummy data. For example, the masker 187 may be configured to generate constant data or data of a preset pattern. By providing dummy data to the transmit channel DT, the transmit channel DT may be inhibited.

Figure 6:
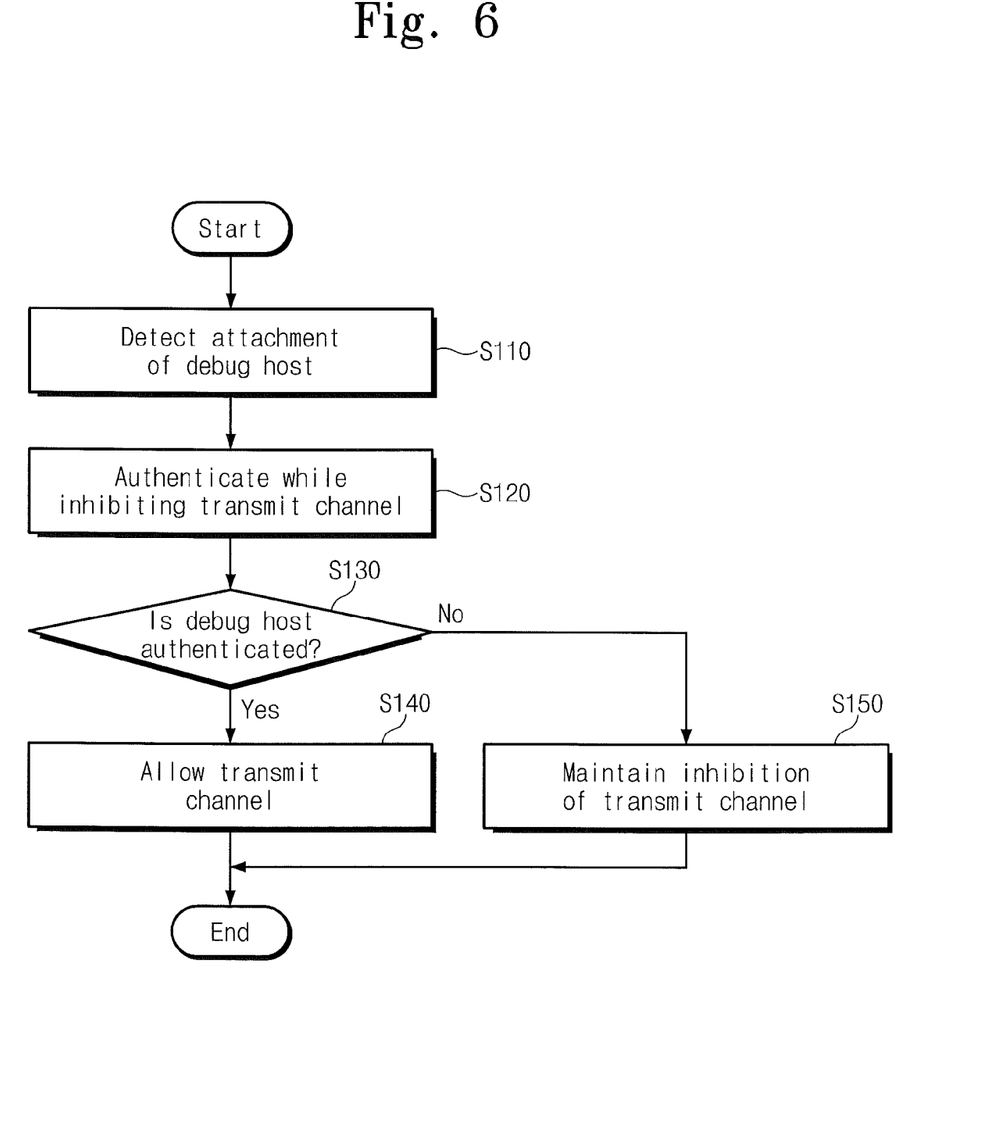
FIG. 6 is a flowchart for describing an operation of the storage device of FIG. 1.

FIG. 6 is a flowchart illustrating operations of the storage device 10 of FIG. 1. In an operation S110, attachment of the debug host is detected. The attachment detection circuit 181 of the debug control circuit 180 (see FIG. 4) may detect attachment of the debug host. When the debug host is detected, the debug control circuit 180 may generate a detection signal DET.

In an operation S120, the transmit channel DT is inhibited and authentication is performed. The protocol conversion circuit 183 may inhibit the transmit channel DT in response to the detection signal DET. Also, the protocol conversion circuit 183 may inhibit debugging performed by the debug host. For example, the protocol conversion circuit 183 may output dummy data to the transmit channel DT. Authentication information may be received from the debug host through the receiving channel DR. The debug host may be authenticated by using the received authentication information.

In an operation S130, it is determined whether or not the debug host is authenticated. When the debug host is authenticated, the transmit channel DT may be enabled in an operation S140. The debugging by the debug host may be also enabled. Accordingly, the debug host may monitor an operation of the storage device 10 by using the transmit and receiving channels DT and DR. Also, the debug host may control an operation of the storage device 10 by using the transmit and receiving channels. For example, it may be possible to break and resume an operation of the storage device 10 by using a break point set in software stored in the storage device 10.

When the debug host is not authenticated, the inhibition of the transmit channel DT is maintained in operation S150. Also, the inhibition of the debugging by the debug host is maintained. For example, the protocol conversion circuit 183 of the debug control circuit 180 may continue to output the dummy data to the transmit channel DT. Accordingly, the debug host may be prevented from monitoring and controlling operation of the storage device 10, which means debugging by the debug host is prevented.

For example, when the debug host is detached, the attachment detection circuit 181 inactivates the detection signal DET. When the detection signal DET is inactivated, the protocol conversion circuit 183 stops outputting the dummy data to the transmit channel DT.

Figure 7:
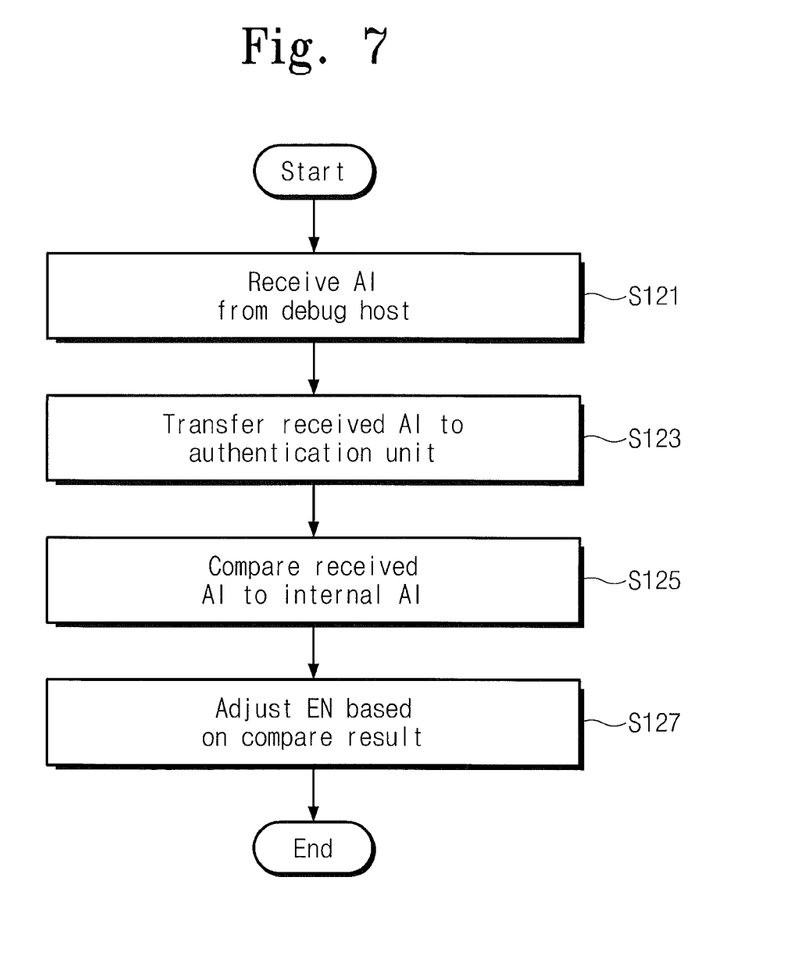
FIG. 7 is a flowchart for describing the authentication operation of FIG. 6.

FIG. 7 is a flowchart for describing the authentication operation S120 of FIG. 6. In an operation S121, authentication information is received from the debug host. For example, the debug host may transfer the authentication information to the debug control circuit 180 through the receiving channel DR (see FIG. 2). The authentication information may be, for example, a password generated by using an algorithm such as SHA-1, Pseudo Random Generation or the like. The debug host may transfer the authentication information corresponding to a seed value stored in the seed generation circuit 171 (see FIG. 3) of the authentication circuit 170 of the storage circuit 10 to the debug control circuit 180.

In an operation S123, the received authentication information is transferred to the authentication circuit 170. For example, the received authentication information may be transferred to the authentication circuit 170 through the second bus 130, the processor 110 and the first bus 120.

In an operation S125, the received authentication information is compared with internally generated authentication information. For example, the internal authentication information may be generated in the AI generation circuit 172 by using the seed provided from the seed generation circuit 171. The received authentication information and the internal authentication information may be compared in the AI check circuit 173.

In an operation S127, the control signal EN may be generated according to the comparison result. For example, when the received authentication information is identical to the internal authentication information, the authentication control circuit 174 may activate the control signal EN. In some embodiments, when a correlation between the received AI and the internal AI meets a predetermined criterion, the authentication control circuit 174 may activate the control signal EN. It will be understood that the method of authenticating the debug host by comparing the AI with the internal AI may be modified and applied variously and that embodiments of the present invention subject matter are not limited to the foregoing operations.

For example, in some embodiments, the control signal EN may be directly transferred from the authentication circuit 170 to the debug control circuit 180. In another example, it will be understood that the control signal EN may be transferred to the debug control circuit 180 through the first bus 120, the processor 110 and the second bus 130. The debug control circuit 180 may enable the transmit channel DT in response to the control signal EN.

As described with reference to FIGS. 6 and 7, while the debug host is attached to the debug control circuit 180, the debug host is authenticated through the debug control circuit 180, the second bus 130, the processor 110 and the authentication circuit 170, and the transmit channel DT is enabled by the debug control circuit 180, the processor 110 may communicate with the storage circuit 200 through the first bus 120. That is, when the debug host is attached to the debug control circuit 180 through the second bus 130, the storage device 10 may operate normally. Also, when the debug host is authenticated, the transmit channel DT may be enabled and the storage device 10 may be configured to normally operate according to a control of the debug host. Accordingly, it will be understood that debugging of the storage device 10 may occur.

For example, the host may transfer a read or write command to the storage device 10. The storage device 10 may perform the read or write command transferred from the host. The debug host may monitor that the storage device 10 performs the read or write command. Also, the debug host may break or resume the read or write command by using a break point defined in codes for performing the read or write command. That is, the debug host may debug the storage device 10.

The debug host may debug a background operation of the storage device 10. For example, the debug host may monitor, break and resume a background operation, such as garbage collection, merge, wear management, etc.

It will be understood that the operation of the storage device 10 which the debug host may debug is not limited to the foregoing operations.

Figure 8:
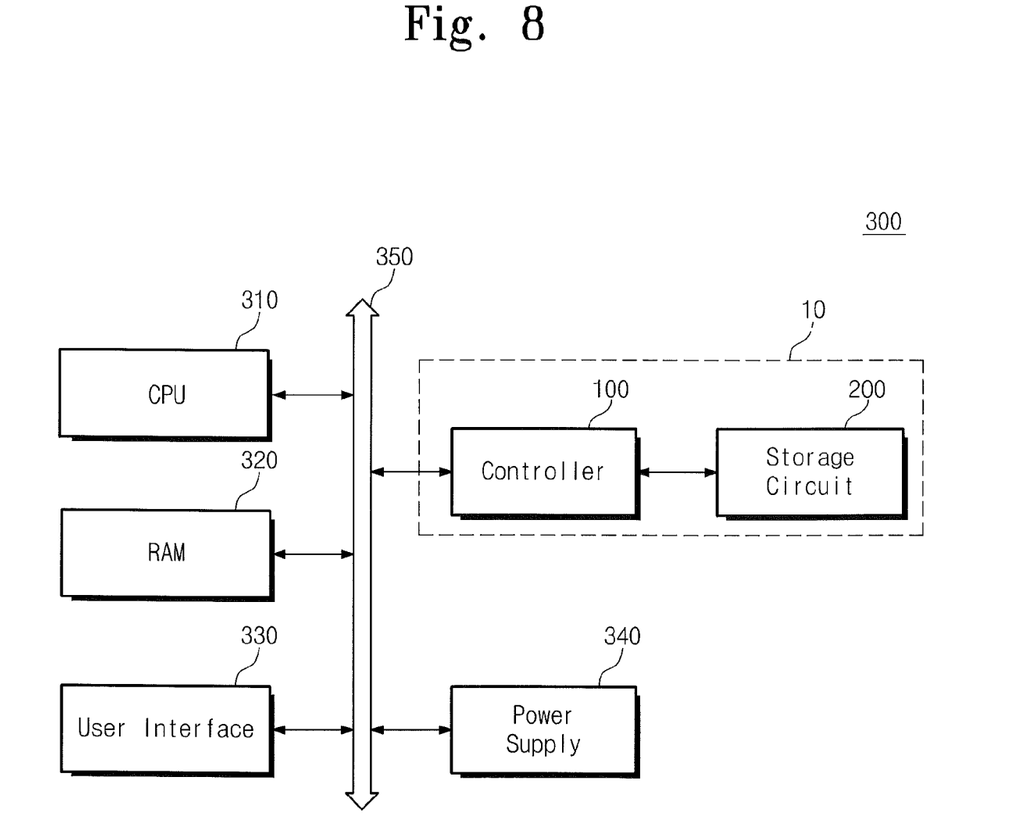
FIG. 8 is a block diagram of a computing system including the storage device of FIG. 1

FIG. 8 is a block diagram of a computing system 300 including the storage device of FIG. 1. Referring to FIG. 8, the computing system 300 according to some embodiments of the inventive subject matter includes a central processing circuit (CPU) 310, a random access memory (RAM) 320, a user interface 330, a power 340 and a storage device 10.

The storage device 10 is electrically attached to the CPU 310, RAM 320, user interface 330 and power 340 through a system bus 350. The data provided through the user interface 330 or processed by the CPU 310 is stored in the storage device 10. The storage device 10 includes a controller 100 and a storage circuit 200. As described with reference to FIGS. 1 through 7, the storage device 10 may be configured to inhibit the transmit channel toward the debug host while authenticating the debug host. When the debug host is authenticated, the storage device 10 may be configured to enable the transmit channel toward the debug host.

In the case where the storage device 10 is implemented as a solid state drive (SSD), a booting speed of the computing system 300 may be enhanced remarkably. Although not shown in the drawings, it will be understood to those skilled in the art that the system according to the present disclosure may further include an application chipset, a camera image processor and the like.

Figure 9:
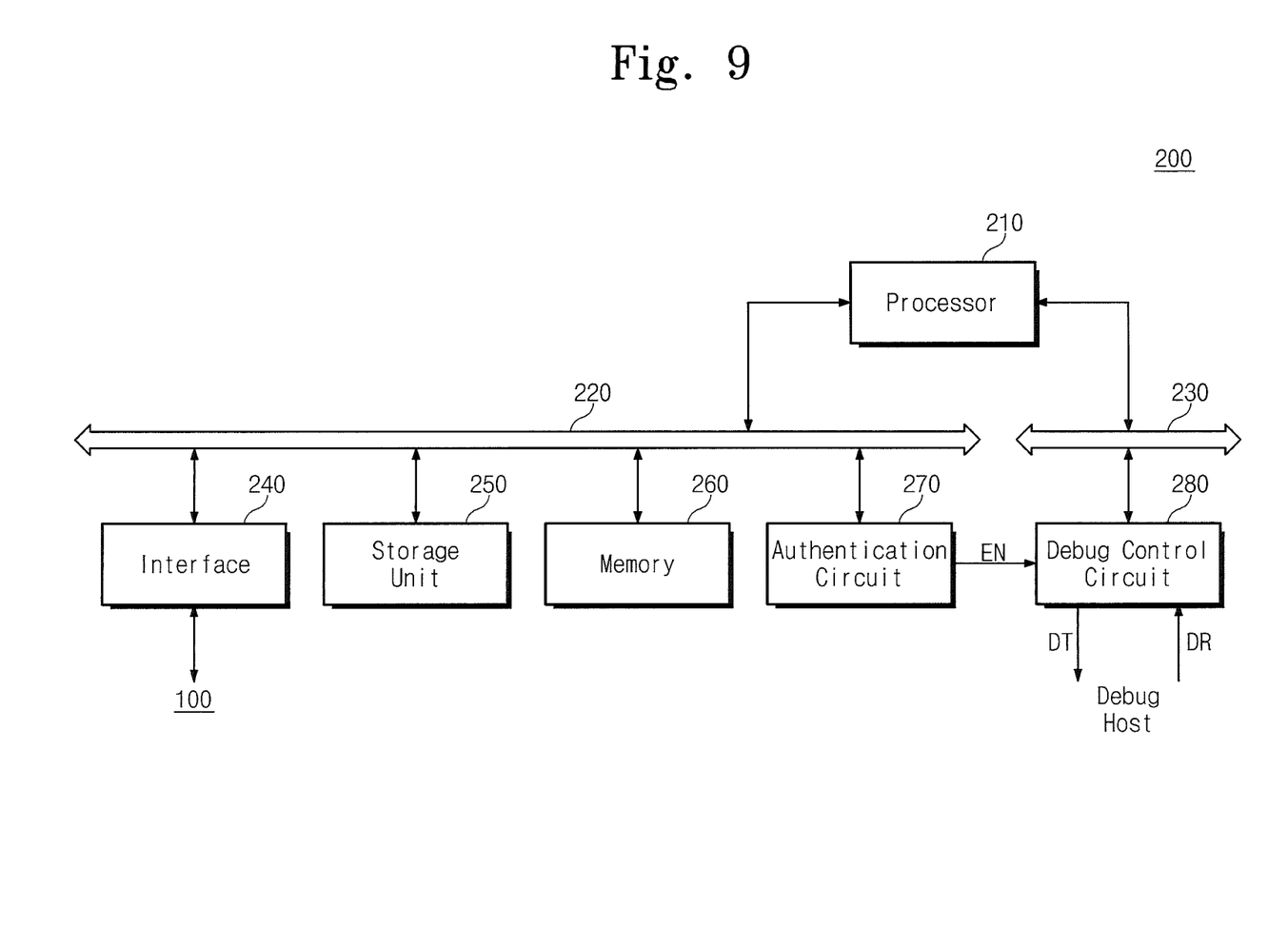
FIG. 9 is a block diagram illustrating a storage circuit according to some embodiments of the inventive subject matter.

FIG. 9 is a block diagram illustrating some embodiments of the storage circuit 200 of FIG. 1. Referring to FIG. 9, the storage circuit 200 includes a processor 210, a first bus 220, a second bus 230, an interface 240, a storage circuit 250, a memory 260, an authentication circuit 270, and a debug control circuit 280.

The processor 210, the first and second buses 220 and 230, the memory 260, the authentication circuit 270, and the debug control circuit 280 may be configured to operate in the same manner as the processor 110, the first and second buses 120 and 130, the memory 160, the authentication circuit 170, and the debug control circuit 180 described with reference to FIGS. 1 through 7, except that the processor 210, the first and second buses 220 and 230, the memory 260, the authentication circuit 270, and the debug control circuit 280 are configured to operate in the storage circuit 200. Further detailed description of these components is omitted in light of the foregoing description of FIGS. 1 through 7.

The interface 240 may be configured to support a protocol necessary for communication between the controller 100 and the storage circuit 200.

The storage circuit 250 may be configured to store data. For example, the storage circuit 250 may include at least two disks. The storage circuit 200 may be configured to magnetically store data in the storage circuit 250. In another example, the storage circuit 200 may be configured to optically store data in the storage circuit 250.

In some embodiments, the storage circuit 250 may include semiconductor memory cells for storing data, i.e., the storage circuit 200 may include a semiconductor memory. For example, the storage circuit 250 may include semiconductor memory cells arranged in an array configuration. The storage circuit 250 may include, for example, nonvolatile memory cells, such as ROM, PROM, EPROM, EEPROM, flash memory, PRAM, MRAM, RRAM, FRAM and the like.

The storage circuit 200 may further include a read/write circuit for writing/reading data in/out of the storage circuit 250. For example, the storage circuit 200 may further include an address decoder for decoding an address transferred from an external device (e.g., controller 100).

The storage circuit 200 may be configured to authenticate the debug host by using the authentication circuit 270 and the debug control circuit 280. While the debug host is authenticated, the transmit channel DT toward the debug ghost and the debugging by the debug host may be inhibited. Authentication information may be transferred from the debug host through the receiving channel DR. The authentication information may be compared with the internal authentication information. When the debug host is authenticated, the transmit channel DT toward the debug host may be enabled and debugging by the debug host may be also enabled. Accordingly, the debug host may monitor and controls the storage circuit 200. While the debug host is authenticated, the processor 210 may communicate with the storage circuit 250 through the first bus 220. That is, the storage circuit 200 may operate normally.

It will be understood that the authentication circuit 270 may be embodied as a digital circuit, an analog circuit or a combination of digital and analog circuits. It will be also understood that the authentication circuit 270 can be embodied in hardware or a combination of hardware and software.

It will be understood that the debug control circuit 280 may be embodied in digital circuitry, analog circuitry or a combination of digital and an analog circuitry. It will be also understood that the debug control circuit 280 can be embodied in hardware or a combination of hardware and software.

As aforementioned, when the debug host is attached, the storage device 10 or the storage circuit 200 is configured to inhibit the transmit channel toward the debug host, inhibit the debugging by the debug host. When the debug host is authenticated, the storage device 10 or the storage circuit 200 is configured to enable the transmit channel toward the debug host and enable the debugging by the debug host. Also, while the debug host is enabled, the storage device 10 or the storage circuit 200 operates normally. Accordingly, debugging may be limited to the authenticated debug host.

The foregoing embodiments have been described by using terms such as storage device 10, storage circuit 200, and storage circuit 250. It will be understood that the terms such as storage device 10, storage circuit 200, and storage circuit 250 are used to discriminate elements, and structures, functions and characteristics of the elements are not limited by the used terms.

According to embodiments of the inventive subject matter described above, the storage device authenticates the debug host while inhibiting the transmit channel toward the debug host. According to the authentication result, the transmit channel toward the debug host is enabled. Accordingly, the security of the storage device is enhanced.

The above-disclosed subject matter is to be considered illustrative and not restrictive, and the appended claims are intended to cover all such modifications, enhancements, and other embodiments, which fall within the true spirit and scope of the inventive subject matter. Thus, to the maximum extent allowed by law, the scope of the inventive subject matter is to be determined by the broadest permissible interpretation of the following claims and their equivalents, and shall not be restricted or limited by the foregoing detailed description.

What is claimed is:

1. A device comprising:
   a first bus;
   a storage circuit coupled to the first bus;
   an authentication circuit coupled to the first bus;
   a second bus separate from the first bus;
   a debug control circuit coupled to the second bus and configured to transmit data to a debug host via a transmit channel and to receive data from the debug host over a receive channel;
   a processor configured to communicate with the storage circuit and the authentication circuit through the first bus and to communicate with the debug control circuit through the second bus
   wherein the debug control circuit is configured to detect an attachment of the debug host and, responsive to detecting the attachment, to inhibit transfer of data from the second bus to the debug host via the transmit channel while allowing authentication information received from the debug host over the receive channel to be transferred to the authentication circuit via the first and second buses, and to continue inhibiting transfer of data from the second bus to the debug host via the transmit channel until the authentication information received from the debug host is authenticated by the authentication circuit.

2. The device of claim 1, wherein the control circuit is configured to inhibit data transfer from the second bus to the debug host by causing dummy data to be transmitted to the debug host over the transmit channel.

3. The device of claim 1, wherein the authentication circuit is configured to internally generate authentication information and to compare the internally generated authentication information with the received authentication information from the debug host.

4. The device of claim 1, wherein the debug control circuit comprises:
   an attachment detection circuit configured to detect attachment of the debug host and to responsively generate a detection signal; and
   a protocol conversion circuit configured to perform a protocol conversion between the debug host and the processor and to inhibit transfer of data from the second bus to the transmit channel in response to the detection signal.

5. The device of claim 4, wherein the protocol conversion circuit comprises a mask circuit configured to output dummy data when a control signal is in an inactive state and to enable transfer between the second bus and the transmit channel when the control signal is in an active state.

6. The device of claim 5, wherein the dummy data comprises constant data.

7. The device of claim 5, further comprising an authentication circuit configured to communicate with the processor through the first bus and to receive authentication information from the debug control circuit via the second bus, the processor and the first bus.

8. The device of claim 7, wherein the authentication circuit is configured to generate internal authentication information, to compare the received authentication information with the internal authentication information and to activate the control signal according to a comparison result.

9. The device of claim 8, wherein the authentication circuit comprises:
   a seed generation circuit configured to generate a seed;
   an internal authentication information generation circuit configured to generate internal authentication information based on the seed;
   an authentication information check circuit configured to compare the received authentication information with the internal authentication information; and
   an authentication control circuit configured to activate the control signal according to the comparison result.

10. The device of claim 8, wherein the authentication circuit is configured to activate the control signal when the received authentication information is identical to the internal authentication information.

11. The device of claim 8, wherein the authentication circuit is configured to activate the control signal when correlation degree between the received authentication information and the internal authentication information meets a predetermined criterion.

12. The device of claim 8, wherein the control signal is directly provided from the authentication circuit to the debug control circuit.

13. The device of claim 8, wherein the control signal is configured to be transferred to the debug control circuit through the first bus, the processor and the second bus.

14. The device of claim 1, wherein the processor is configured to communicate with the storage circuit while the debug host is authenticated.

15. The device of claim 1, wherein the first bus, the second bus and the processor are included in a solid state drive (SSD).

16. The device of claim 1, wherein the first bus, the second bus, the storage circuit and the processor are included in a memory card.

17. A device comprising:
   a storage circuit;
   a debug control circuit configured to be coupled to an exterior debug host, to transmit data to the debug host via a transmit channel and to receive data from the debug host over a receive channel;
   a first bus;
   a second bus coupled to the debug control circuit and isolated from the first bus; and
   a processor coupled to the first bus and to the second bus and configured to communicate with the debug control circuit through the second bus and the storage circuit through the first bus;
   wherein the debug control circuit is configured to detect an attachment of the debug host and, responsive to detecting the attachment, to enable transmission of authentication data received from the debug host over the receive channel from the debug control circuit to the processor and to inhibit transfer of data from the processor to the debug host via the transmit channel and the second bus from detection of the attachment until authentication of the authentication data.

18. A method of operating a device comprising a processor and a storage circuit coupled by a system bus, the method comprising:
   detecting a coupling of a debug host to a debug control circuit, wherein the debug control circuit is coupled to the processor via a debug bus separate from the system bus, the debug control circuit configured to transmit data to the debug host via a transmit channel and to receive data from the debug host over a receive channel;
   responsive to the detection of the coupling, enabling transmission of authentication data received from the debug host via the receive channel to the processor and inhibiting transfer of data from the debug bus to the debug host via the transmit channel from the detection of the coupling until authentication of the authentication data; and
   enabling transfer of data from the debug bus to the debug host via the transmit channel responsive to authentication of the authentication data,
wherein, while the authentication data is being authenticated, the processor is enabled to perform read and/or write operations to the storage circuit over the system bus.

* * * * *